US010251343B2

(12) United States Patent
Missotten et al.

(10) Patent No.: US 10,251,343 B2
(45) Date of Patent: Apr. 9, 2019

(54) STALKED CROP HARVESTING HEADER STRUCTURE

(71) Applicant: CNH Industrial America LLC, New Holland, PA (US)

(72) Inventors: Bart M. A. Missotten, Herent (BE); Tom De Smet, Maldegem (BE); Frederik Tallir, Esen (BE); Willem Vandamme, Ichtegem (BE); Geert Bonne, Damme (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/253,423

(22) Filed: Aug. 31, 2016

(65) Prior Publication Data
US 2017/0055448 A1 Mar. 2, 2017

(30) Foreign Application Priority Data
Aug. 31, 2015 (BE) .................................. 2015/5552

(51) Int. Cl.
*A01D 45/02* (2006.01)
*A01D 57/01* (2006.01)
(Continued)

(52) U.S. Cl.
CPC ........... *A01D 57/01* (2013.01); *A01D 43/083* (2013.01); *A01D 45/021* (2013.01);
(Continued)

(58) Field of Classification Search
CPC .. A01D 45/021; A01D 45/025; A01D 34/015; A01D 34/73; A01D 34/8355; A01D 43/08; A01D 45/02
See application file for complete search history.

(56) References Cited

U.S. PATENT DOCUMENTS

| 309,462 A | 12/1884 | Hopper |
| 439,203 A | 10/1890 | Spaulding |
(Continued)

FOREIGN PATENT DOCUMENTS

| CN | 201045786 Y | 4/2008 |
| CN | 205071707 U | 3/2016 |
(Continued)

*Primary Examiner* — Arpad Fabian-Kovacs
(74) *Attorney, Agent, or Firm* — Peter K. Zacharias

(57) ABSTRACT

A stalked crop harvesting header comprising multiple harvesting units each comprising a pair of deck plates defining a channel, a pair of snapping rollers mounted below the deck plates and adapted to pull stalks downwardly through the channel, a pair of gathering chains provided with cams, the gathering chains extending between a first pair of gears located at a front end of the harvesting unit and a second pair of gears located at a back end of the harvesting unit, wherein each harvesting unit further comprises a pair of stalk guiders positioned to rotate around axes coinciding with respective axes of the first pair of gears, wherein the stalk guiders each comprise an upper stalk guiding wheel and a lower stalk guiding wheel which are interconnected, and wherein a cutting element is provided below the lower stalk guiding wheel to cut stalks while being guided by the stalk guider.

19 Claims, 6 Drawing Sheets

(51) Int. Cl.
*A01D 43/08* (2006.01)
*A01D 57/22* (2006.01)
*A01D 101/00* (2006.01)

(52) U.S. Cl.
CPC ............ *A01D 45/028* (2013.01); *A01D 57/22* (2013.01); *A01D 2101/00* (2013.01)

(56) References Cited

U.S. PATENT DOCUMENTS

| | | | |
|---|---|---|---|
| 1,869,269 A | | 7/1932 | Miller |
| 2,418,575 A | * | 4/1947 | Christiansen ........ A01D 25/042 |
| | | | 171/36 |
| 2,534,481 A | | 12/1950 | Spraker |
| 2,870,593 A | | 1/1959 | Anderson |
| 3,333,405 A | | 8/1967 | Bulin |
| 3,585,789 A | * | 6/1971 | Blanshine ............ A01D 43/082 |
| | | | 56/106 |
| 3,736,733 A | * | 6/1973 | Fell ........................ A01D 34/00 |
| | | | 56/98 |
| 3,961,466 A | * | 6/1976 | Martin ................ A01D 43/082 |
| | | | 56/14.3 |
| 4,106,270 A | * | 8/1978 | Weigand ............. A01D 43/082 |
| | | | 56/98 |
| 4,106,271 A | * | 8/1978 | Carey ................. A01D 43/082 |
| | | | 56/119 |
| 5,934,054 A | * | 8/1999 | Landeis ................ A01D 57/22 |
| | | | 171/DIG. 1 |
| 7,395,649 B2 | | 7/2008 | Wubbels et al. |
| 8,286,410 B2 | | 10/2012 | Priepke et al. |
| 9,295,196 B2 | | 3/2016 | Surmann et al. |
| 9,532,505 B2 | | 1/2017 | Long et al. |
| 9,603,304 B2 | | 3/2017 | Lambertini |
| 2011/0011048 A1 | * | 1/2011 | Hoffman .............. A01D 45/023 |
| | | | 56/119 |
| 2015/0101303 A1 | | 4/2015 | Priepke |

FOREIGN PATENT DOCUMENTS

| | | | | |
|---|---|---|---|---|
| DE | 19527698 | A1 | | 2/1997 |
| DE | 102011118207 | A1 | | 5/2013 |
| DE | 102013004859 | A1 * | 9/2014 | ........... A01D 43/082 |
| DE | 102015115100 | A1 * | 3/2017 | ......... A01D 34/8355 |
| DE | 102015116375 | A1 * | 3/2017 | ............. A01D 41/14 |
| EP | 3143864 | A1 | | 3/2017 |
| FR | 1448547 | | | 1/1966 |
| FR | 2485871 | A1 | | 1/1982 |

* cited by examiner

STALKED CROP HARVESTING HEADER STRUCTURE

CROSS REFERENCE TO RELATED APPLICATION

This application claims priority to Belgian Application No. 2015/5552 filed Aug. 31, 2015, the contents of which are incorporated herein by reference.

BACKGROUND OF THE INVENTION

The present invention relates to a stalked crop harvesting header for an agricultural vehicle.

Stalked cropped harvesting headers are formed to pull stalks downward between a pair of deck plates that are spaced in such a manner that the stalk can substantially freely move through the channel formed by the deck plates while the corn head or other crop material heads are retained by the deck plates. Different aspects of such harvesting headers have been described. For example, WO 2012/152 866 describes the snapping rollers that are used to grasp and pull stalks downward through the channel. EP 2 412 228 describes a header wherein the spacing between the deck plates is adjustable to optimize the operation of the header. These documents describe headers that are row sensitive. Row sensitive headers are headers that operate correctly only when the channels of the multiple harvesting units in the header are aligned with the rows of stalked crop on the field. As a result of aligning the channel with the stalked crop, the stalked crop can enter the channel while the stalked crop is still rooted in the ground. In conventional row sensitive stalked crop harvesting headers, this ensures correct operation of the header.

A drawback of the known crop harvesting headers is that they only perform correctly when the rows of crop are aligned with the channels of the harvesting units. This places a burden on the driver of the agricultural vehicle because care should be taken that the vehicle is steered so that the channels are constantly aligned with the rows of stalked crop during the harvesting. Another drawback is that stalked crop can be sown in rows with different spacing. To be able to harvest rows with different spacings, different headers are required wherein the distance between the channels match the spacing between the rows of crop. To overcome these drawbacks of row sensitive harvesting, row non-sensitive harvesting headers have been proposed.

U.S. Pat. No. 6,119,443 describes a row non-sensitive harvesting header. A drawback of this header is that the mechanical structure is complex so that the header is expensive. Furthermore, because stalks are cut from the ground surface before entering the channel, the guiding of the stalks proves to be difficult resulting in the possibility of congestion of an entrance of the channel. In this context, tests have shown that stalks can experience a high resistance against entering the channel and entering the snapping rollers. Due to this resistance, the stalks choke the front end of the channels thereby ceasing the correct operation of the header.

US 2014/005 994 describes a row non-sensitive header wherein the stalks are caught at a higher level thereby preventing the stalks to fall down after being cut from the ground. This improves the movement of the stalks in between the snapping rollers and the channel, however it makes the header significantly more complex and expensive.

It is an object of the present invention to provide a row non-sensitive stalked crop harvesting header with a higher operational reliability and an improved structure.

SUMMARY OF THE INVENTION

To this end, the invention provides a stalked crop harvesting header comprising multiple harvesting units, wherein each harvesting unit comprises a pair of deck plates defining a channel, a pair of snapping rollers mounted below the deck plates and adapted to grasp and pull stalks downwardly through the channel, a pair of gathering chains provided with cams, the gathering chains extending between a first pair of gears located at either side of the front end of the harvesting unit and a second pair of gears located at a back end of the harvesting unit, the gathering chains being provided for conveying stalks along the channel, wherein each harvesting unit further comprises a pair of stalk guides positioned to rotate around axes coinciding with respective axes of the first pair of gears, wherein the stalk guides each comprising an upper stalk guiding wheel and a lower stalk guiding wheel which are operationally connected to each other for guiding stalks in a movement towards the channel, and wherein a cutting element is provided below the lower stalk guiding wheel to cut stalks while being guided by the stalk guides.

The stalked crop harvesting header of the invention is row non-sensitive due to the cutting elements which are provided below the stalk guiding wheels. These cutting elements cut stalks from the ground surface so that stalks that are not aligned with the channel can correctly be guided towards the channel via the stalk guides. Furthermore, the stalk guides comprise an upper and a lower stalk guiding wheel. Particularly due to the connection between the upper and the lower stalk guiding wheel, the structure of the harvesting header is significantly simplified. Since the stalk guides comprise an upper and a lower guiding wheel, the stalk is held at two locations along the height of the stalk, so that falling of the stalk after cutting is prevented. Thereby stalks can be guided in a movement towards the channel. This improves the operational reliability of the header. Guiding the stalks at two different heights via a lower and an upper guiding wheel towards the channel has as a result that reliable guidance is obtained so that clogging of the channel entrance is maximally prevented.

Preferably, each gear of the first pair of gears rotates around a respective shaft, and wherein the respective shafts are further connected to corresponding upper stalk guiding wheels and lower stalk guiding wheels so that the upper and lower stalk guiding wheels are interconnected via the respective shafts. Due to the connection of the first pair of gears with the respective stalk guides, the stalk guides rotate simultaneously with the first pair of gears. Therefore, due to the connection, the stalk guides are driven via the first pair of gears so that no separate actuator or motor should be provided at the front end of the harvesting unit. Typically, the gathering chain is actuated via a motor or actuator connected to the second pair of gears. This further simplifies the structure of the harvesting units. Furthermore, the direct connection proves to be an advantage since the speed with which stalks are guided by the stalk guides in synchronized with the speed with which stalks are moved through the channel by the gathering chain. This synchronization prevents clogging and ensures correct operation of the harvesting header.

Preferably, each gathering chain is further provided to extend along a positioning gear positioned at either side of a front end of the channel. By guiding the gathering chain, in addition to the first and second gear, along a positioning gear, particularly the position of the first gear can be more freely chosen without affecting the correct operation of the gathering chain. When the axes of the stalk guides are aligned with the axes of the first gears of the gathering chain, it might be preferable to position the first gear more offset with respect to the center plane of the harvesting unit, thereby enlarging the extent of the stalk guides. However without a positioning gear, this could result in the gathering chain being positioned too far from the channel to efficiently force the stalks in a movement along the channel. With the positioning gear, the location of the gathering chain with respect to the channel can be determined irrespective of the offset of the first gear.

Preferably, a distance between the positioning gear axis and the corresponding front gear axis is approximately equal to the radius of the upper guiding wheel. Thereby, the positioning gear is located at a periphery of the upper guiding wheel. Since the positioning gear is located at a front end of the channel, this location of the positioning gear optimizes the transferring of the stalks, namely stalks can be guided by the stalk guides towards an entrance of the channel, where the stalks are then forced in a movement through the channel via the gathering chains.

Preferably, each stalk guiding wheel is disk-shaped and comprises indentations at a periphery of the disk. Such disk-shaped guiding wheel proves to be an efficient way of guiding stalks. The disk-shape allows a simple structure of the harvesting unit, is easy to actuate and when provided with indentations, is able to guide stalks by catching the stalks in the guides thereby guiding stalks with high precision. Thereby, the indentations are preferably adapted to capture at least one stalk such that the stalk extends within the peripheral edges of the disk-shaped wheel.

Preferably, the header comprises multiple lane determining elements extending from a front end of the header in a forward driving direction, wherein the multiple lane determining elements separate the multiple harvesting units from each other in the lateral direction. The lane determining elements ensure that stalks are prevented from arriving between two harvesting units, which would have as a result that these stalks are not processed. Particularly in row non-sensitive harvesting headers, these lane determining elements prove to be advantageous for this purpose. A stalk which is caught between two lane determining elements will thereby automatically, due to the forward movement of the harvester carrying the header, be caught by the stalk guides. This ensures correct further processing of the stalks by the harvesting unit.

Preferably, the pair of upper stalk guiding wheels extend, in the lateral direction of the harvesting unit over a distance that is larger than the spacing between adjacent lane determining elements. Thereby the complete front end of the header is covered by stalk guiding wheels so that stalks are, irrespective of their position at the front end of the header, always caught by a guiding wheel.

Preferably, each harvesting unit is further provided with a stalk chopper below the snapping rollers for chopping the stalk into pieces when it is pulled downward. Via the stalk chopper, the residue of the stalked crop material is cut into small pieces so that the harvester is in its forward movement not hindered by the residue.

Preferably, each cutting element is formed as a stalk cutting wheel rotatably mounted about an axis coinciding with the respective axis of the first pair of gears, wherein the stalk cutting wheel is connected to the respective first pair of gears via transmission device so that the gear rotates at a first rotational speed while the stalk cutting wheel rotates at a second rotational speed which is higher than the first rotational speed. Tests have shown that a rotating stalk cutting wheel is much more efficient in cutting the stalks compared to a fixed cutting knife. By powering the rotating stalk cutting wheel via a transmission device connected to the first pair of gears, no additional actuator or motor should be provided, which further simplifies the structure of the harvesting header. Thereby preferably, the transmission device is formed as a planetary gearbox.

Preferably, the stalk guiding guides each comprise a frame carrying the upper stalk guiding wheel and the lower stalk guiding wheel, wherein the frame further comprises a protrusion between the upper and the lower stalk guiding wheels, which protrusion comprises a support for carrying a respective front end of the snapping rollers. This frame can hold together multiple components so that the structure of the harvesting header can be made simple.

The invention further relates to an agricultural harvester carrying a stalked crop harvesting header according to the above-described invention. The invention further relates to a harvesting unit adapted for being part of a stalked crop harvesting header, wherein the harvesting unit comprises a pair of deck plates defining a channel, a pair of snapping rollers mounted below the deck plates and adapted to grasp and pull stalks downwardly through the channel, a pair of gathering chains provided with cams, the gathering chains extending between a first pair of gears located at either side of the front end of the harvesting unit and a second pair of gears located at a back end of the harvesting unit, the gathering chains being provided for conveying stalks along the channel, wherein each harvesting unit further comprises a pair of stalk guides positioned to rotate around axes coinciding with respective axes of the first pair of gears, wherein the stalk guides each comprising an upper stalk guiding wheel and a lower stalk guiding wheel which are interconnected, and wherein a cutting element is provided below the lower stalk guiding wheel to cut stalks while being guided by the stalk guides. Multiple of these harvesting units built together form the harvesting header which is described above. The effects and advantages described above in relation to the harvesting header of the invention are a direct result of the technical features of the harvesting unit. Therefore these effects and advantages equally apply to the harvesting unit, as will be understood by the skilled person.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
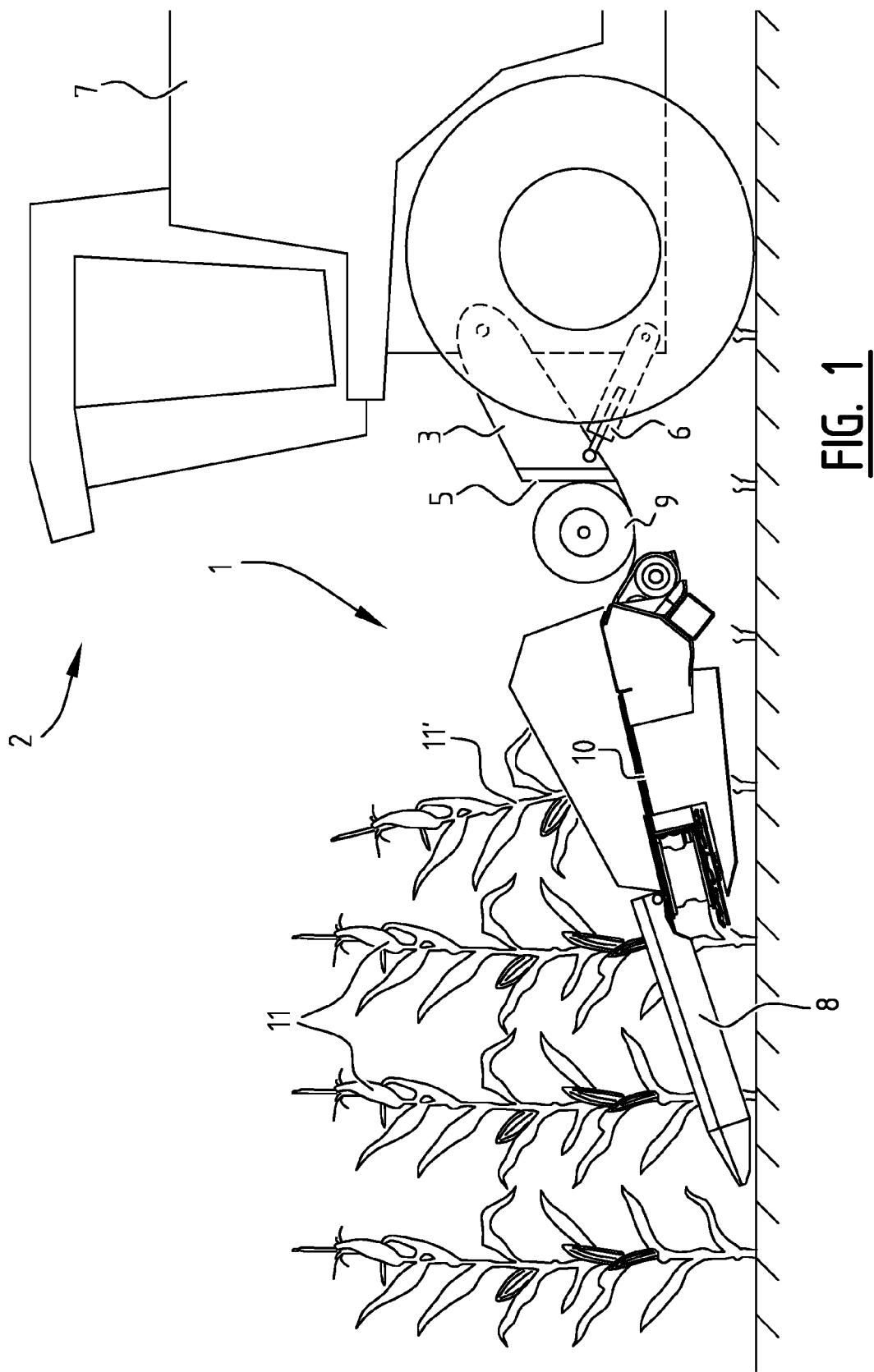
FIG. 1 illustrates a side view of an agricultural vehicle carrying a stalked crop harvesting header according to an embodiment of the invention.

FIG. 1 illustrates a stalked crop harvesting header 1 mounted to an agricultural vehicle 2, preferably an agricultural harvester. Thereby, the figure illustrates how the agricultural vehicle 2 is driven over a field with stalked crop 11. The header 1 is adapted to harvest the stalked crop 11, and to gather at least a part of the harvested crop, for example the crop elements, into the body 7 of the agricultural vehicle 2. The gathered crop elements can be further processed in the body 7 of the agricultural vehicle 2.

The header 1 is connected to the agricultural vehicle 2 via a feeder 3 and an actuator 6. The feeder 3 and the actuator 6 are connected to a header mounting plate 5, which header mounting plate 5 carries the header 1. Crop elements gathered by the header 1 are transported to the body 7 of the agricultural vehicle 2 via the feeder 3.

The header 1 comprises multiple lane determining elements 8. These lane determining elements 8 are formed as protrusions at a front end of the header 1 extending substantially in the forward driving direction of the vehicle 2. The lane determining elements are positioned between adjacent harvesting units 10 so that a respective lane is formed for each of the harvesting units 10. Thereby, the lane determining elements 8 function as a guide for the stalked crops on the field to guide each of the stalked crops into a lane and towards a harvesting unit 10. This is further shown and explained in relation to FIG. 2.

Once a stalked crop 11 is caught in the harvesting unit 10, the stalked crop is cut from the ground surface and is pulled downward, as is illustrated in FIG. 1 with crop element 11'. Preferably the stalk of the stalked crop is chopped while pulling the stalk downward. The crop elements, for example the corn crops, are torn away from the stalk during the pulling downward of the stalk. Thereby crop elements are at least partially separated from residue by the header. Crop elements are then gathered by screw conveyor 9. Screw conveyor 9 conveys the crop towards the feeder 3 so that the crop can be further processed in the body 7 of the agricultural harvester 2.

Figure 2:
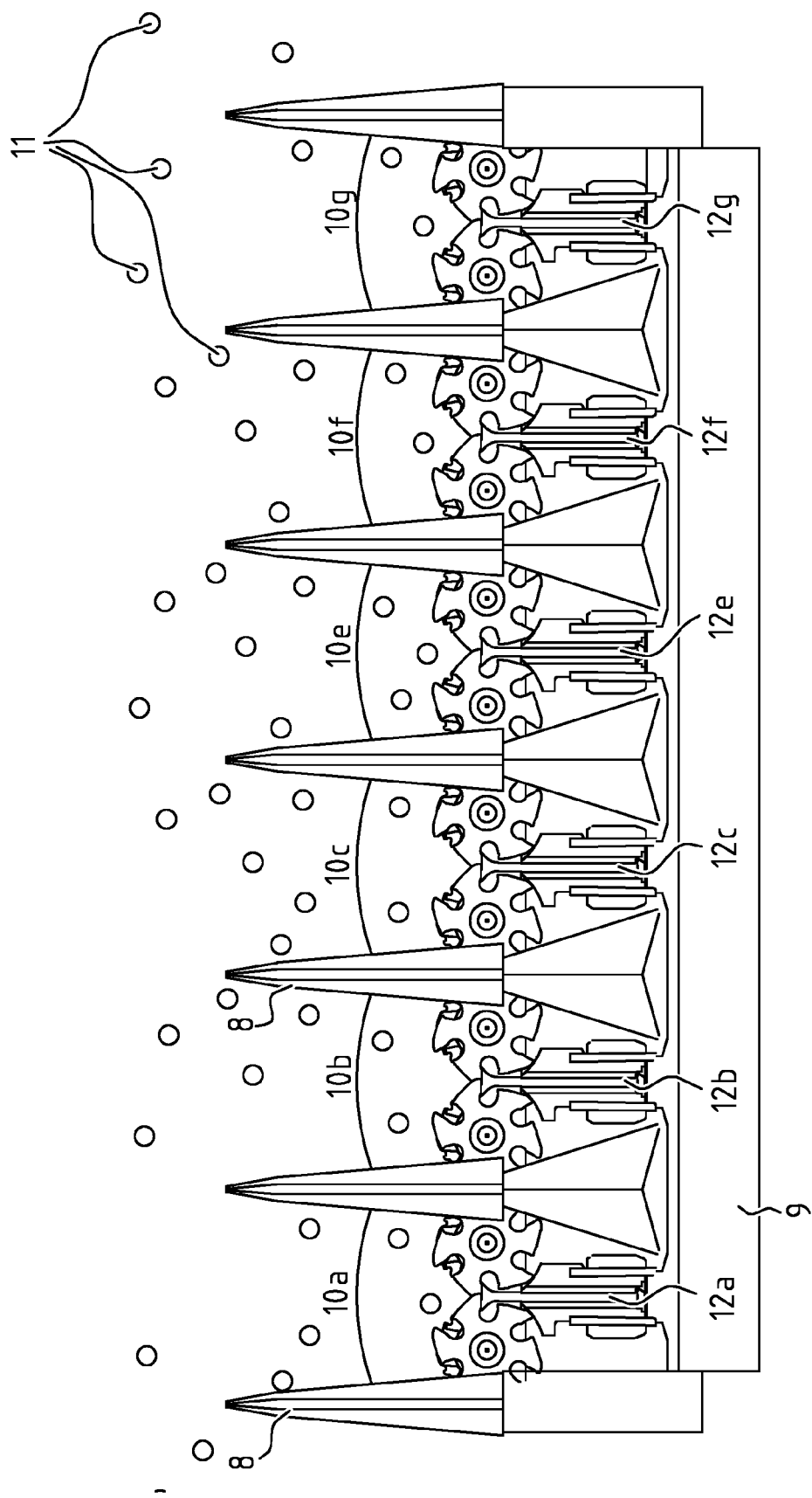
FIG. 2 illustrates a top view of the harvesting header of FIG. 1.

FIG. 2 shows a top view of the header 1 of FIG. 1. FIG. 2 shows how the header 1 extends over a significant width which is at least larger than the width of the agricultural harvester 2. The header 1 comprises multiple harvesting units (10a, 10b, . . . , 10g). When the header 1 is driven over a field with stalked crop, the stalked crop is guided towards one of the harvesting units via the lane determining elements 8, as will be clear to the skilled person from FIG. 2. Each harvesting unit 10 comprises a channel 12. Thereby, the harvesting units are provided for harvesting the stalked crop by processing the stalked crop in the channel, as will be described hereunder. FIG. 2 further shows the screw conveyor 9 at a back end of the header 1, and wherein the screw conveyor 9 is formed to transport the crop elements from the multiple harvesting units to a central opening (not shown) for transferring the crop elements to the feeder 3 and further to the agricultural vehicle 2.

Figure 3:
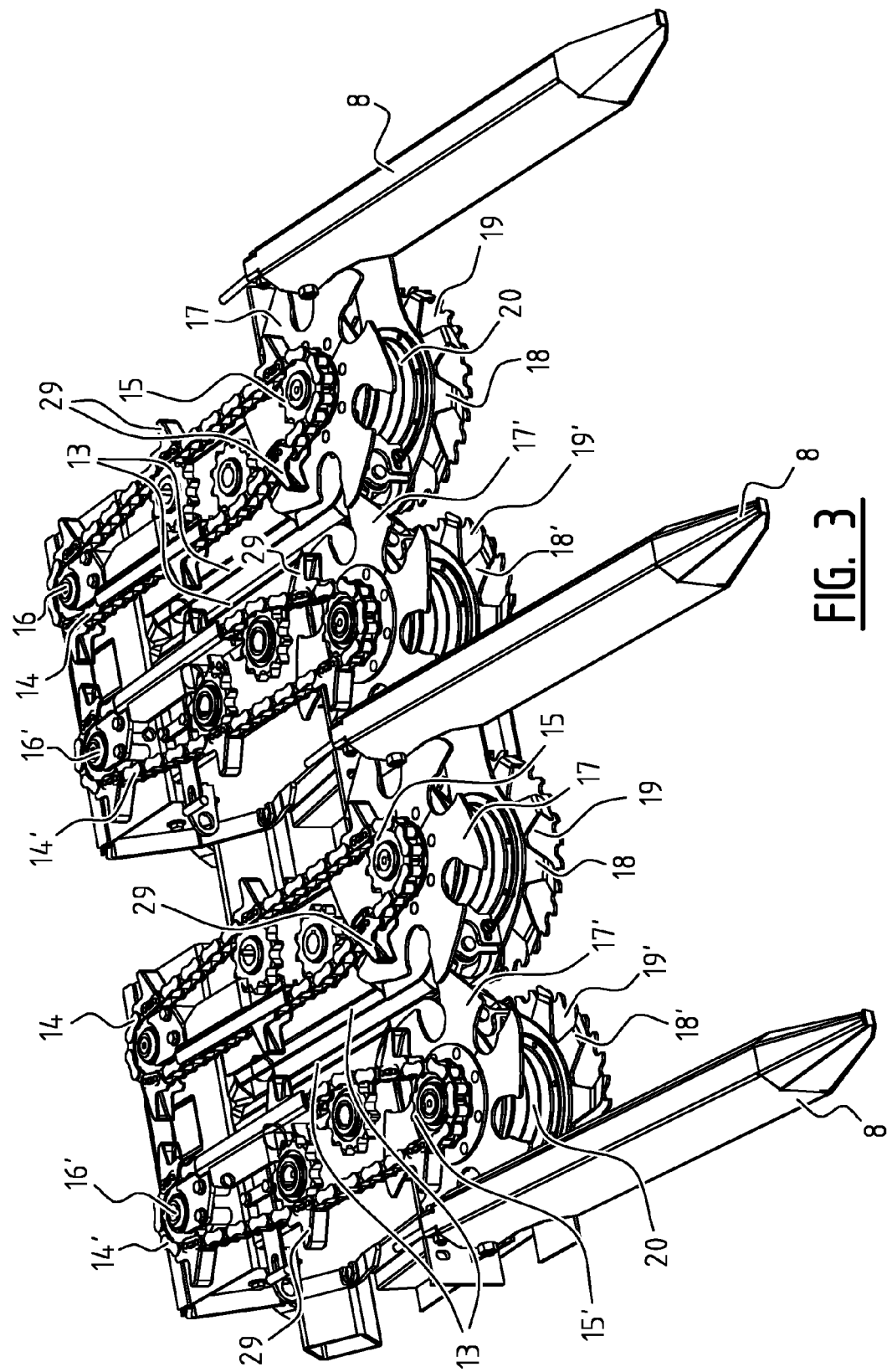
FIG. 3 shows a perspective view of two adjacent harvesting units of the harvesting header of an embodiment of the invention.

FIG. 3 shows two harvesting units in more detail. Thereby, it can be seen in FIG. 3 that the channel 12 of each harvesting unit 10 is defined by a set of deck plates 13. Preferably, two deck plates 13 are provided at a predetermined distance from one another to obtain a channel having a width which is determined by the predetermined distance.

The deck plates 13 can have a predefined position, or can be mounted moveable with respect to each other so that the width of the channel between the deck plates can be adapted. In sophisticated harvesting headers, the distance between the deck plates can be automatically adapted based on sensor measurements relating to the harvesting process to thereby optimize the harvesting operation.

Above the deck plates 13, each harvesting unit 10 comprises a pair of gathering chains 14. Thereby, a first gathering chain 14 is provided at a first lateral side of the channel while another gathering chain 14' is provided at a second lateral side of the channel. Furthermore, each gathering chain of the pair of gathering chains extends between a first, front gear 15 and a second, back gear 16. Thereby, front and back are defined in relation to the relative intended movement of the stalked crop elements through the channel, whereby front relates to the position where the stalked crop element arrives first in the channel and wherein back relates to the position where the stalked crop elements are moved towards when moving through the channel. The gathering chain is preferably provided with cams 29 which are defined as lateral protrusions from the chain which are able to at least partially hook behind stalked crop elements moving through the channel, so that the gathering chain is able, via the cams 29, to pull stalked crop elements through the channel from a front end towards a back end of the channel.

To optimize the gathering chain operation, further chain positioning gears can be provided for further defining the position of the gathering chain with respect to the channel defined by the deck plates 13. Two of such additional gears for each gathering chain are shown in FIG. 3. Each gathering chain 14 is driven at a gathering chain speed in such a manner that the cams 29 transport the stalked crop elements through the channel. Thereby, the gathering chain speed can be predetermined or is preferably related to the forward driving speed of the agricultural vehicle carrying the stalked crop harvesting header 1. The gathering chain speed can be further related to the density of stalked crop elements 11 on the field. Further preferably, the gathering chain speed is adapted based on sensor measurements relating to the harvesting process. The gathering chains 14 are preferably actuated at a back of the harvesting unit. In the example of FIG. 3, preferably the second pair of gears 16, 16' are provided with a rotary actuator for driving the gathering chains. An advantage of driving the gathering chains at a back of the harvesting unit, is that there is more space for actuators at the back of the harvesting unit.

Each harvesting unit 10 preferably further comprises a pair of stalk guides 17, 18. Thereby the stalk guides 17, 18 are adapted to guide all stalks in the harvesting unit lane, which lane is defined by the lane determining elements 8, towards a lateral center of the harvesting unit 10 so that the stalks can be processed in the channel. Consequently, each harvesting unit 10 has a pair of stalk guides s 17, 18 at either side of the front end of the channel. The stalk guides 17, 18 preferably cooperate with cutting element 19 positioned underneath the stalk guides 17, 18 so that when stalks are guided to the lateral center of the harvesting unit, the stalks can be cut from the ground surface. As a result of cutting the stalks from the ground surface, moving stalks towards the center is possible without cracking or bending the stalks.

Each one of the pair of stalk guides of a harvesting unit preferably comprises a frame 20 adapted to carry stalk guiding elements and crop processing elements of the harvesting units, as will be further described hereunder.

Each one of the pair of stalk guides preferably comprises an upper stalk guiding wheel 17 and a lower stalk guiding wheel 18. The upper stalk guiding wheel is preferably mounted at an upper end of the frame 20 while the lower stalk guiding wheel is preferably mounted at a lower end of the frame 20. In this manner, the frame 20 determines the distance between the upper 17 and the lower 18 stalk guiding wheel. Each stalk guiding wheel 17, 18 is preferably disk-shaped wherein the periphery of the disk is provided with multiple indentations. Thereby, each indentation is shaped to catch and hold at least one stalk of the stalked crop 11. The indentations can be formed to be able to enclose multiple stalks at the same time. In this manner, when the stalk guiding wheels rotate, the disks tend to catch and transport the stalks along at least a part of the front end of the disks.

The frame 20 can be shaped, or provided with an element, to push stalks out of the indentations of the stalk guiding wheels when the stalks arrive at an entrance of the channel 12 of the harvesting unit 10. The upper and lower stalk guiding wheels 17, 18 preferably show a distance between each other of at least 5 centimeters, more preferably of at least 8 centimeters, most preferably of at least 10 centimeters. Further preferably, the upper and lower stalk guiding wheels 17, 18 are interconnected via a shaft. As a result of the interconnection via the shaft, the upper stalk guiding wheel and the lower stalk guiding wheel rotate about the same axis and rotate at the same speed. This improves correct guidance of the stalks. The shaft interconnecting the guiding wheels is preferably further connected to the front gear 15 of the gathering chain 14. This has as a direct result that no actuator or motor should be provided at the front end of the harvester for driving the guiding wheels 17, 18. Namely, the gathering chain is driven via the rear gear 16, and this rotation is transferred via the gathering chain 14 to the front gear 15 which can further transmit its rotation via the shaft to the upper and lower guiding wheel 17, 18. Another result of the connection between the gathering chain and the stalk guides is that the speed of the gathering chain 14 is directly linked to the rotational speed of the guiding wheels. In practice, this proves to be an advantage since a faster rotation of the guiding wheels, and thereby faster movement of stalks towards the channel, is followed by a faster movement of the stalks through the channel by the gathering chain 14. Thereby, stalk collecting speed, determined by the speed of the guiding wheels, is correlated to the stalk processing speed that is determined by the speed of the gathering chain.

Figure 6:
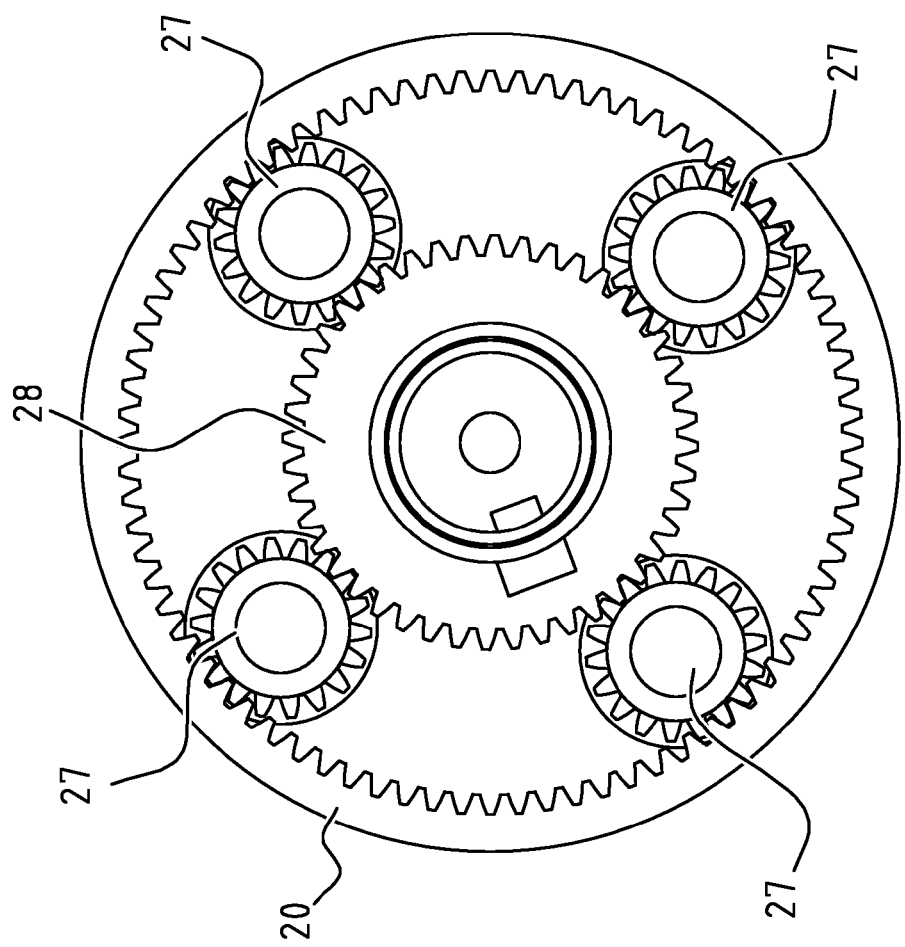
FIG. 6 shows a horizontal cross-section of the frame comprising a planetary gearbox as is usable in a harvesting unit according to an embodiment of the invention.

Preferably, a stalk cutting wheel 19 is provided at a lower end of the frame 20, more preferably below the lower stalk guiding wheel 18. According to a first embodiment, the stalk cutting wheel is formed as a knife which is mounted to the frame in a fixed, stand still, position. Thereby the stalk guiding wheels force the stalks along the knifes so that the stalks are cut. According to a preferred embodiment, the stalk cutting wheel is driven and operates as a blade saw. Thereby, the stalk cutting wheel is preferably disk-shaped, wherein teeth can be provided at the periphery of the disk for improving cutting properties. The cutting wheel preferably rotates around the same axis as the corresponding stalk guiding wheels. However, the cutting wheel preferably rotates significantly faster than the stalk guiding wheels. Such faster rotation can be obtained by providing a separate actuator for the cutting wheel. However, preferably the cutting wheel is connected to the stalk guiding wheels via a gearbox. The gearbox is preferably located inside the frame 20. The gearbox can be formed as a planetary gearbox, as is shown in FIG. 6.

Figure 4:
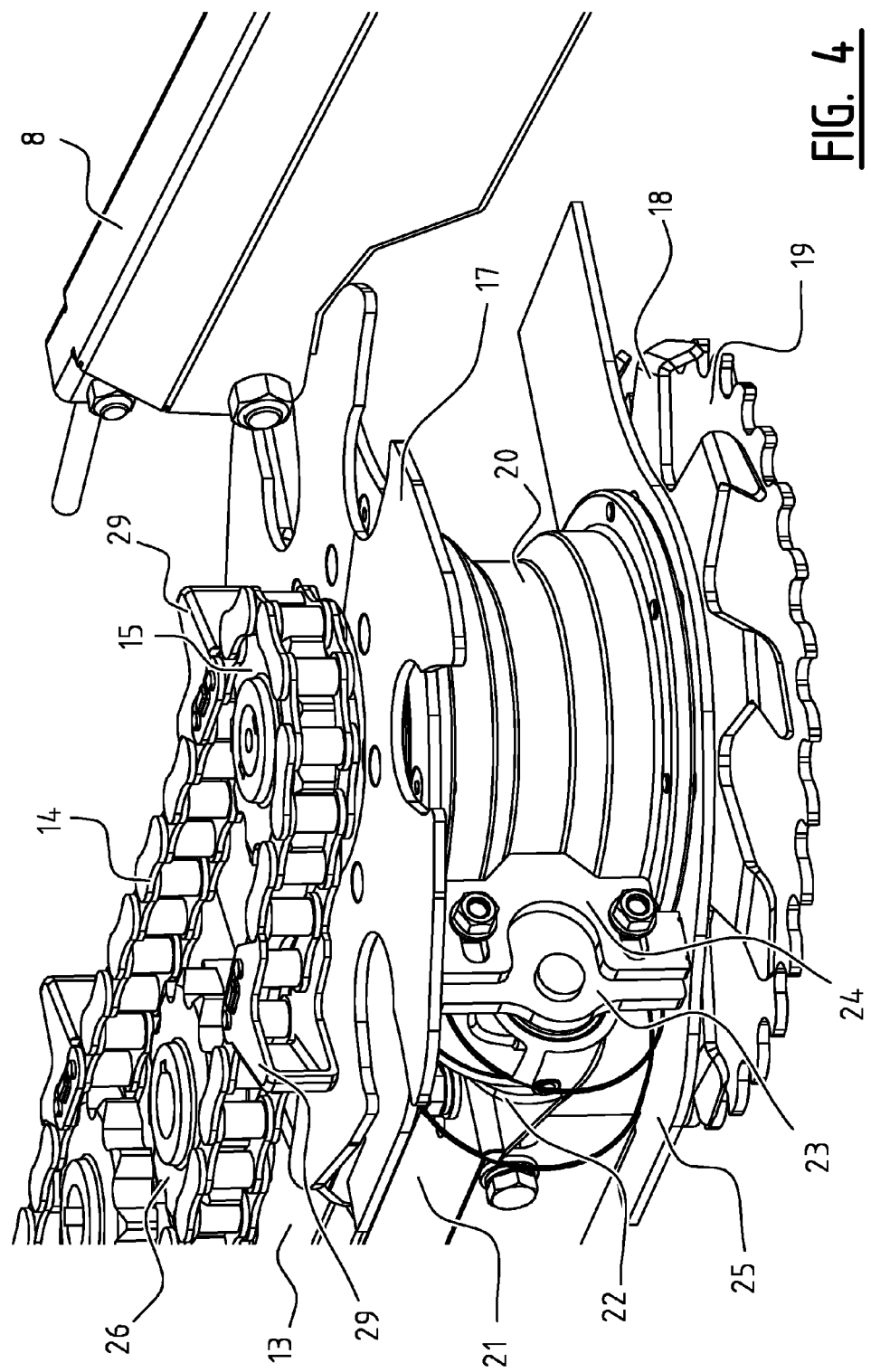
FIG. 4 shows a close-up of a front end of one side of one of the harvesting units of FIG. 3.

The frame 20 is further preferably provided with a protrusion comprising a support for carrying a front end of the snapping rollers, which are described hereunder in relation to FIG. 4. In this manner, the frame 20 is in the preferred embodiment as shown in FIG. 3 multifunctional and carries the front gear 15 of the gathering chain 14, the stalk guides 17, 18, defines the distance between the upper guiding wheel 17 and the lower guiding wheel 18, carries the transmission elements interconnecting the guiding wheels and the cutting wheel 19, and forms a support for a front end of the snapping rollers 21.

FIG. 4 shows a perspective view of one side of the channel 12. Thereby, FIG. 4 only shows one element from each of the pairs of elements that form part of the harvesting unit 10. It will be clear that in operation the two elements of the pairs cooperate together to obtain correct operation of the harvesting unit, as will be further shown in FIG. 5. However, construction related issues and choices can be described based on FIG. 4 since this is substantially the same for the two lateral sides of the harvesting unit. Thereby, the skilled person will understand that a plane of symmetry can be defined at a center of the channel 12, and the harvesting unit 10 is built largely symmetrical about the plane of symmetry.

FIG. 4 shows the above described gathering chain 14, guided over a front gear 15. FIG. 4 further shows the upper stalk guiding wheel 17 and the lower stalk guiding wheel 18, and a frame 20 being mounted between the upper and lower stalk guiding wheel. Below the lower stalk guiding wheel 18, the stalk cutting wheel 19 is provided. FIG. 4 further shows one of the two deck plates 13. Below each one of the deck plates 13 (only one deck plate 13 is shown in FIG. 4), a snapping roller 21 is mounted. The pair of snapping rollers is thereby formed and positioned with respect to each other to be able to grasp the stalks in the channel, and to pull these stalks downwards by rotating the snapping rollers. Thereby, stalks are pulled downwards in the channel and consequently pulled downward between the deck plates. The distance between adjacent deck plates 13 is chosen so that the stalks can freely pass through the deck plates while the crop elements are retained by the deck elements 13. This is the result of the crop elements typically being significantly larger in width than the stalks. In this manner, the harvesting unit obtains a separation between stalks and crop elements. Snapping rollers are known in the art and therefore the technical features of these rollers are not described in more detail in this description.

The snapping rollers 21 are preferably provided with a tapered thread at a front end of each snapping roller. The tapered thread is provided to pull stalks, arriving at a front end of the channel, in between the snapping rollers 21. Tests have shown that snapping rollers, because they grasp and pull down the stalks, form a resistance for stalks to enter in between the rollers. Because the harvesting units of the present invention cut the stalks at a lower end, such resistance by the snapping rollers could have as a result that the stalks at least not directly enter the snapping rollers thereby choking the front end of the channel. The tapered thread at a front end of the snapping rollers prevents this by guiding and forcing the stalks in between the snapping rollers 21.

The snapping rollers 21 are rotatebly mounted around respective axis so that each snapping roller rotates around a shaft. This shaft is born at a back end of the snapping rollers and at a front end of the snapping roller. Preferably, the snapping rollers are actuated at a back end of the snapping rollers while the shaft is only held in place at a front end of the snapping roller 21. FIG. 4 illustrates how the front end of the shaft of the snapping roller 21 is supported by the frame 20. In the embodiment of FIG. 4, a supporting element 23 is rigidly mounted to frame 20, particularly to a protrusion 24, which protrusion is specifically provided for mounting the supporting element 23 at the frame 20.

The frame 20 has a predetermined shape which is adapted for performing multiple functions. The frame 20 extends between the upper and the lower stalk guiding wheel 17, 18 to mount these guiding wheels at a predetermined distance from each other. Furthermore, the frame 20 preferably comprises the gear elements connecting the stalk guiding wheels 17, 18 with the stalk cutting wheel 19 so that the stalk cutting wheel 19 can rotate at a significantly higher speed than the guiding wheels. A front end of the frame, whereby front end is considered in relation to the normal moving direction of the harvesting header, extends significantly less to the front than the stalk guiding wheels. As a result, the periphery of the stalk guiding wheels can manipulate the stalks without interference of the frame 20. At an entrance of the channel, the frame 20 is shaped to push stalks out of the guiding wheels 17, 18. Therefore, the frame 20 comprises a stalk pushing element 25 which is shaped to form a funnel for the channel entrance. When a stalk is grasped by the stalk guides, and is held in an indentation of the guiding wheels, rotation of the guiding wheels will move the stalk towards the funnel, where the stalk is pushed out of the indentation by the funnel shape. In this manner, stalks are guided to the channel entrance, and are forced into the channel.

FIG. 4 further shows a gathering chain positioning gear 26 which is provided near an entrance of the channel to guide the gathering chain along the channel. This positioning gear 26 thereby allows the first gear 15 to show an offset with respect to the channel, thereby allowing the stalk guiding wheel 17, 18 to be aligned with and driven by the first gear 15, while the gathering chain 14 is close enough to the channel for the protrusions to be able to hook behind the stalks and force the stalks through the channel.

FIG. 4 further shows how the front end of the snapping roller 21 is mounted to the frame 20, considered in the direction of the channel, at the location of the guiding wheel axis. Furthermore, the front end of the snapping roller 21 is mounted within the periphery of the guiding wheels 17, 18. As a result, a front end of the snapping roller 21 extends at least partially, preferably completely between the upper stalk guiding wheel 17 and the lower stalk guiding wheel 18. This proves to be a compact and space efficient manner of mounting the different elements together. A further effect is that the guiding wheels can hold and guide the stalks while the stalks enter in between the snapping rollers 21. As described above, entering in between the snapping rollers 21 can be difficult for a stalk since there is a resistance against entering. By mounting the front end of the snapping rollers between the upper and the lower stalk guiding wheel, stalks are not released in the movement from the stalk guiding wheels to the channel. This results in a highly reliable operation wherein choking of the entrance of the channel is avoided.

Figure 5:
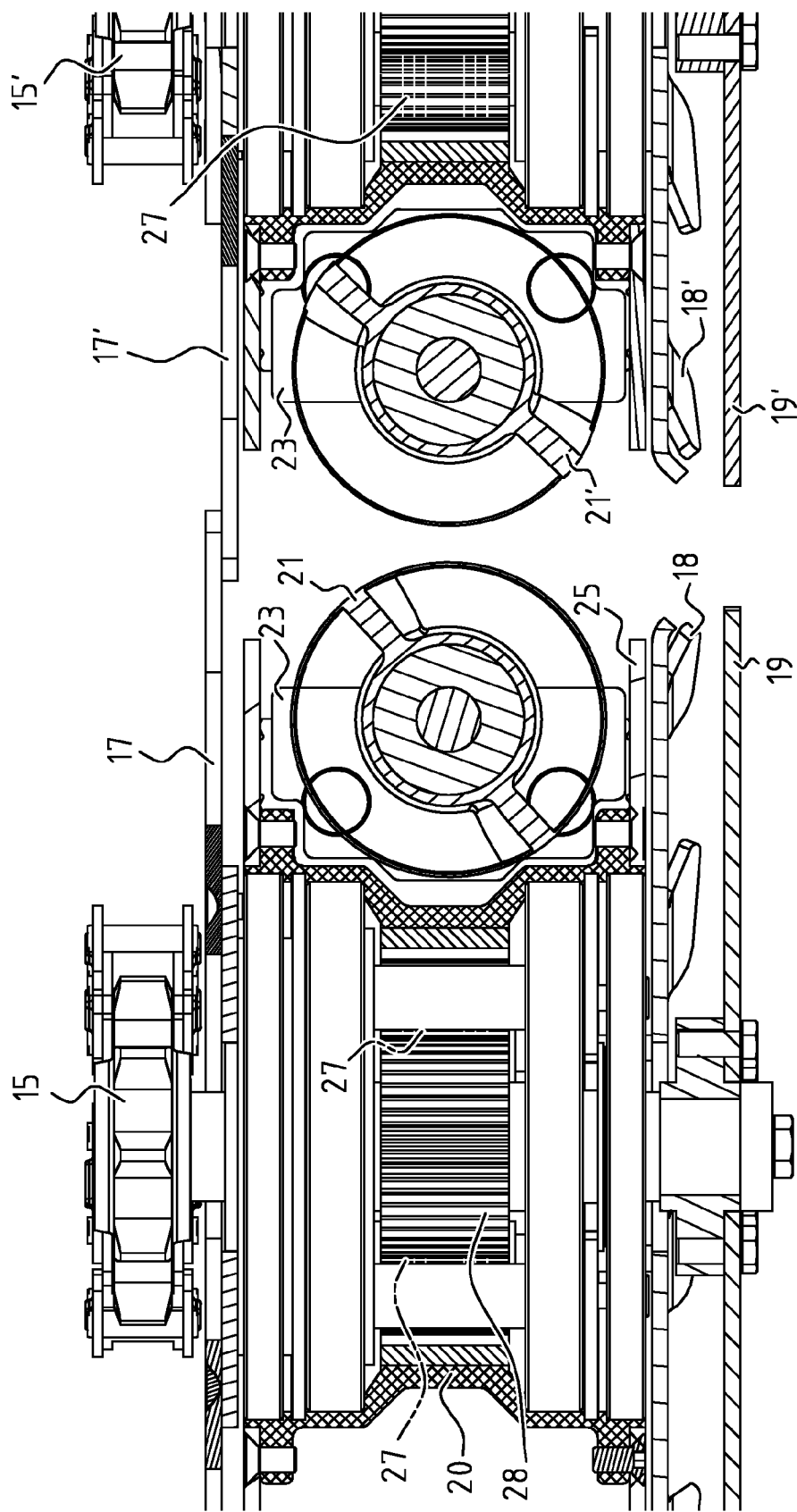
FIG. 5 shows a cross-section of a front end of one of the harvesting units of FIG. 3.

FIG. 5 shows a cross-section of a front end of the harvesting unit. The cross-section is made substantially at the axes of the front gears 15, 15' of the gathering chains of the harvesting unit. The cross-section illustrates how the front gear 15 is connected, via element 27 which will be described hereunder, to the upper stalk guiding wheel 17 and the lower stalk guiding wheel 18. By the interconnection of the lower stalk guiding wheel 18, upper stalk guiding wheel 17 and front gear 15, the latter can rotate simultaneously.

FIG. 5 further shows how the frame 20 comprises a planetary gear system wherein the frame 20 operates as a ring gear while element 27 operates as planetary gear elements and wherein element 28 operates as a sun wheel. Thereby, the planetary gear system can be designed in such a manner that the sun wheel 28 rotates significantly faster than the planetary gear elements 27. The planetary gear elements 27 are connected to the first gear 15 and the upper stalk guiding wheel 17 and the lower stalk guiding wheel 18, while the sun wheel is connected to the stalk cutting wheel 19. Thereby, actuating the gathering chain 14 has as a result that the front gear 15 is rotated, thereby also rotating the stalk guides 17, 18, and driving the gear elements 27, 28 so that also the stalk cutting wheel 19 is driven. Thereby, the stalk cutting wheel 19 is driven at a significantly higher rotational speed than the stalk guiding wheels 17, 18.

The FIG. 5 shows that the pair of upper stalk guiding wheels 17, 17' show an overlap in the lateral direction of the harvesting unit. Therefore, in the embodiment of FIG. 5, the left upper stalk guiding wheel 17 is mounted a little higher than the right one of the pair of upper stalk guiding wheels 17'. In this manner, the upper stalk guiding wheels 17 and 17' can have an overlap without colliding.

It will be clear for the skilled person that in the example of FIG. 5 the elements of the harvesting unit 10 shown on the left hand side rotate in a first direction, for example clockwise when looking top down, while the elements on the right hand side of the figure rotate in an opposite direction, for example counterclockwise when considered top down. As a result, both the elements on the left hand side as well as the elements on the right hand side move the stalks towards the channel which is located centrally in the lateral direction. In the present description, corresponding elements on the left and on the right hand side are considered as a pair. Thereby, each harvesting unit has a pair of first gears 15, 15', a pair of upper stalk guiding wheels 17, 17', a pair of lower stalk guiding wheels 18, 18', a pair of stalk cutting wheels 19, 19', a pair of frames 20, 20', etc. These pairs of elements cooperate to guide the stalks towards and through the channel of the harvesting unit.

FIG. 5 also illustrates the pair of snapping rollers 21, 21'. Each roller is mounted via a corresponding mounting element 23, 23' to the corresponding frame 20, 20'. Thereby, the front end of each snapping roller 21 is located at least partially between the upper and the lower stalk guiding wheels 17, 18. The effect of this position of the snapping rollers 21 with respect to the stalk guiding wheels is described above.

FIG. 6 illustrates an example of the planetary gearbox which is suitable to be built into the frame 20. The figure shows the ring wheel 20, formed by the frame, shows the sun wheel 28, which will typically rotate at a high rotational speed compared to the planetary gear elements 27. The skilled person will understand how such planetary gearbox operates, how such planetary gearbox can be designed and how such planetary gearbox can be built into the frame 20 as described above.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A stalked crop harvesting header comprising multiple harvesting units, wherein each harvesting unit comprises:
   a pair of deck plates defining a channel, a pair of snapping rollers mounted below the deck plates, and a pair of gathering chains provided with cams, the gathering chains extending between a first pair of gears located at either side of the front end of the harvesting unit and a second pair of gears located at a back end of the harvesting unit, wherein each harvesting unit further comprises:

a pair of stalk guides positioned to rotate around axes coinciding with respective axes of the first pair of gears, wherein the stalk guides each comprising:

an upper stalk guiding wheel and a lower stalk guiding wheel which are coupled to each other, and wherein a cutting element is provided below the lower stalk guiding wheel to cut stalks, wherein each said cutting element is formed as a stalk cutting wheel rotatably mounted about an axis coinciding with the respective axis of the first pair of gears, wherein the stalk cutting wheel is connected to the respective first pair of gears via a transmission device so that the gear rotates at a first rotational speed while the stalk cutting wheel rotates at a second rotational speed which is higher than the first rotational speed.

2. The stalked crop harvesting header according to claim 1, wherein each gear of the first pair of gears rotates around a respective shaft, and wherein the respective shafts are further connected to corresponding upper stalk guiding wheels and lower stalk guiding wheels via the respective shafts.

3. The stalked crop harvesting header according to claim 1, further comprising a positioning gear, wherein the gathering chain is further provided to extend along the positioning gear positioned at either side of a front end of the channel.

4. The stalked crop harvesting header according to claim 3, wherein a distance between an axis of the positioning gear and an axis of the corresponding gear of the first pair of gears is approximately equal to the radius of the upper guiding wheel.

5. The stalked crop harvesting header according to claim 1, wherein each stalk guiding wheel is disk-shaped and comprises indentations at a periphery of the disk.

6. The stalked crop harvesting header according to claim 1, wherein the header comprises multiple lane determining elements extending from a front end of the header in a forward driving direction, wherein the multiple lane determining elements separate the multiple harvesting units from each other in the lateral direction.

7. The stalked crop harvesting header according to claim 6, wherein the outer diameter of the pair of upper stalk guiding wheels extend, in the lateral direction of the harvesting unit over a distance that is larger than the spacing between adjacent lane determining elements.

8. The stalked crop harvesting header according to claim 1, wherein the transmission device is formed as a planetary gearbox.

9. The stalked crop harvesting header according to claim 1, wherein the stalk guides each comprise a frame carrying the upper stalk guiding wheel and the lower stalk guiding wheel, wherein the frame further comprises a protrusion between the upper and the lower stalk guiding wheels, which protrusion comprises a support for carrying a respective front end of the snapping rollers.

10. An agricultural harvester carrying a stalked crop harvesting header according to claim 1.

11. A stalked crop harvesting header comprising:
a conveyor; and at least one harvesting unit having a front end and a back end, the at least one harvesting unit comprising:

at least two deck plates defining a channel;

at least two snapping rollers mounted below the at least two deck plates;

at least two first gears located at either side of the front end of the at least one harvesting unit;

at least two second gears located at either side of the back end of the at least one harvesting unit;

at least two gathering chains provided with cams, the at least two gathering chains extending between respective ones of the at least two first gears and respective ones of the at least two second gears, the at least two gathering chains;

at least two stalk guiders positioned to rotate around axes coinciding with axes of respective ones of the at least two first gears, each of the at least two stalk guiders comprising an upper stalk guiding wheel and a lower stalk guiding wheel which are coupled to each other; and a cutting element disposed below the lower stalk guiding wheels of the at least two stalk guiders to cut stalks, wherein the cutting element comprises a first stalk cutting wheel and a second stalk cutting wheel, wherein each of the first and second stalk cutting wheels is rotatably mounted about an axis coinciding with an axis of a respective one of the at least two first gears, wherein each of the first and second stalk cutting wheels is connected to the respective one of the at least two first gears via a transmission so that the respective one of the at least two first gears rotates at a first rotational speed while the each of the first and second stalk cutting wheels rotates at a second rotational speed which is higher than the first rotational speed.

12. The stalked crop harvesting header according to claim 11, wherein each gear of the at least two first gears rotates around a respective shaft, and wherein the respective shafts are further connected to corresponding ones of the upper stalk guiding wheels and corresponding ones of the lower stalk guiding wheels so that the upper and lower stalk guiding wheels of each of the at least two stalk guiders are interconnected via the respective shaft.

13. The stalked crop harvesting header according to claim 11, further comprising of at least two positioning gears, wherein the at least one harvesting unit further comprises the at least two positioning gears positioned at either side of the front end of the channel, and wherein each of the at least two gathering chains extends along a respective one of the at least two positioning gears.

14. The stalked crop harvesting header according to claim 13, wherein a distance between an axis of each of the at least two the positioning gears and an axis of a corresponding one of the at least two first gears is approximately equal to a radius of the upper guiding wheel of a corresponding one of the at least two stalk guiders.

15. The stalked crop harvesting header according to claim 11, wherein each of the upper and lower stalk guiding wheels of each of the at least two stalk guiders is disk-shaped and comprises indentations at a periphery thereof.

16. The stalked crop harvesting header according to claim 11, further comprising at least one lane determining element extending from a front end of the header in a forward driving direction, the at least one lane determining element separating the at least one harvesting unit from another harvesting unit in the forward driving direction.

17. The stalked crop harvesting header according to claim 16, wherein the upper stalk guiding wheels of the at least two stalk guiders extend in the forward driving direction over a distance that is larger than a spacing between the at least one lane determining element and an adjacent lane determining element.

18. The stalked crop harvesting header according to claim 11, wherein the transmission connecting the each of the first and second stalk cutting wheels to the respective one of the at least two first gears is a planetary gearbox.

19. The stalked crop harvesting header according to claim 11, wherein each of the at least two stalk guiders comprises a frame carrying the upper stalk guiding wheel and the lower stalk guiding wheel of the each of the at least two stalk guiders, the frame comprising a protrusion between the upper and the lower stalk guiding wheels of the each of the at least two stalk guiders, the protrusion comprising a support for carrying a front end of a respective one of the at least two snapping rollers.

* * * * *